US012800930B2

(12) United States Patent
Fan et al.

(10) Patent No.: US 12,800,930 B2
(45) Date of Patent: Nov. 17, 2026

(54) OPTICAL WAVEGUIDE DEVICE FOR DIFFRACTION DISPLAY AND DISPLAY DEVICE

(71) Applicant: JIAXING UPHOTON OPTOELECTRONICS TECHNOLOGY CO., LTD., Tongxiang City (CN)

(72) Inventors: Zhentao Fan, Tongxiang City (CN); Xingming Zhao, Tongxiang City (CN); Kehan Tian, Tongxiang City (CN)

(73) Assignee: JIAXING UPHOTON OPTOELECTRONICS TECHNOLOGY CO., LTD., Tongxiang City (CN)

( * ) Notice: Subject to any disclaimer, the term of this patent is extended or adjusted under 35 U.S.C. 154(b) by 291 days.

(21) Appl. No.: 18/681,849

(22) PCT Filed: Jan. 10, 2023

(86) PCT No.: PCT/CN2023/071570
§ 371 (c)(1),
(2) Date: Feb. 6, 2024

(87) PCT Pub. No.: WO2023/134670
PCT Pub. Date: Jul. 20, 2023

(65) Prior Publication Data
US 2024/0272427 A1 Aug. 15, 2024

(30) Foreign Application Priority Data
Jan. 13, 2022 (CN) ........................ 202210039244.5

(51) Int. Cl.
*G02B 27/01* (2006.01)
*G02B 6/34* (2006.01)
*G02B 27/00* (2006.01)

(52) U.S. Cl.
CPC .......... *G02B 27/0172* (2013.01); *G02B 6/34* (2013.01); *G02B 27/0081* (2013.01)

(58) Field of Classification Search
CPC ......................... G02B 27/017; G02B 27/0172
See application file for complete search history.

(56) References Cited

U.S. PATENT DOCUMENTS

2020/0166691 A1* 5/2020 Vartiainen ............ G02B 5/1842
2021/0165142 A1* 6/2021 Blomstedt .......... G02B 27/0172
(Continued)

FOREIGN PATENT DOCUMENTS

CN 109459813 A 3/2019
CN 111065953 A 4/2020
(Continued)

OTHER PUBLICATIONS

International Search Report issued in corresponding International Application No. PCT/CN2023/071570, dated Feb. 22, 2023, pp. 1-4, CNIPA, Beijing, China.

*Primary Examiner* — Michael Stahl
(74) *Attorney, Agent, or Firm* — HAUPTMAN HAM, LLP

(57) ABSTRACT

The present application discloses an optical waveguide device, which comprises a waveguide substrate and a coupling-in grating and a coupling-out grating arranged on the waveguide substrate, and the coupling-in grating is configured to couple an input light beam from the outside of the waveguide substrate into the waveguide substrate so that the input light beam can be transmitted to the coupling-out grating through total reflection. Wherein the coupling-in grating has a grating vector direction pointing to the coupling-out grating, and the coupling-out grating includes a one-dimensional region in which a one-dimensional grating is formed and a two-dimensional region in which a two-
(Continued)

dimensional grating is formed. The application further discloses display equipment comprising the optical waveguide device.

13 Claims, 7 Drawing Sheets

(56) References Cited

U.S. PATENT DOCUMENTS

| | | | | |
|---|---|---|---|---|
| 2022/0026619 | A1* | 1/2022 | Park | G02B 27/4205 |
| 2022/0099990 | A1* | 3/2022 | Olkkonen | G02B 5/1866 |
| 2022/0197036 | A1* | 6/2022 | Valera | G02B 1/005 |
| 2022/0206300 | A1* | 6/2022 | Park | G02B 27/0172 |
| 2023/0333301 | A1* | 10/2023 | Song | G02B 27/0081 |
| 2023/0417974 | A1* | 12/2023 | Schultz | G02B 6/0036 |

FOREIGN PATENT DOCUMENTS

| | | | | |
|---|---|---|---|---|
| CN | 111830715 | A | | 10/2020 |
| CN | 213690119 | U | | 7/2021 |
| CN | 113777707 | A | | 12/2021 |
| CN | 113960796 | A | * | 1/2022 |
| WO | WO 2021/098742 | A1 | * | 5/2021 |

* cited by examiner

OPTICAL WAVEGUIDE DEVICE FOR DIFFRACTION DISPLAY AND DISPLAY DEVICE

The present application is a National Phase of International Application Number PCT/CN2023/071570, filed Jan. 10, 2023, which claims priority to Chinese Application No. 202210039244.5, filed on Jan. 13, 2022.

This application claims the priority of Chinese Patent Application No. 202210039244.5, filed on Jan. 13, 2022 and entitled “OPTICAL WAVEGUIDE DEVICE FOR DIFFRACTION DISPLAY AND DISPLAY DEVICE”, which is incorporated herein by reference in its entirety.

FIELD OF THE INVENTION

The present invention relates to diffraction-based display technology, in particular to an optical waveguide device for diffraction display based on a one-dimensional grating and a two-dimensional grating, and a display device comprising the optical waveguide device.

BACKGROUND

The diffraction-based display technology has developed rapidly in recent years, and it can be applied in near-eye display devices, head-mounted display devices, head-up display devices, and other display devices to realize augmented reality (AR) display, as well as to realize virtual reality (VR) display, mixed reality (MR) display, and so on.

As an important component of diffraction-based display technology, optical waveguide device is also continuously improved. The optical waveguide device has the advantages of strong mass production and thinness, but the brightness of the displayed image (corresponding to the optical coupling efficiency/utilization efficiency of the optical waveguide device) and uniformity (corresponding to the uniformity of the outgoing light field of the optical waveguide device) still need to be improved. A conventional optical waveguide device for diffraction display based on a two-dimensional coupling-out grating is shown in FIG. 12, where input light beam carrying image information is coupled into the waveguide from coupling-in grating A: the coupling-out grating B is a two-dimensional grating, which receives the light coupled in from the coupling-in grating A and transmitted through the waveguide, spreads the light two-dimensionally within the waveguide through diffraction and simultaneously couples the light out of the waveguide (to human eyes). FIG. 12 schematically represents light beam incident on the coupling-in grating and the propagation of the light beam in the waveguide substrate, especially in the coupling-out grating, with circles. As shown in FIG. 12, when the coupling-out grating B is a two-dimensional grating, the diffraction orders comprise orders that are coupled out of the waveguide (coupling-out orders) and the orders of total reflection inside the waveguide (transmission orders) a, b, c, d, e, f, where the transmission orders c, d, and e are backward transmitted, and the order b is also biased backward transmitted, and the forward and outward effective transmission order is mainly total reflection zeroth-order a (largest energy proportion), followed by diffraction order f. It can be seen that the traditional two-dimensional coupling-out grating has a lower propagation efficiency in two-dimensional expansion to the outside and accordingly a lower coupling-out efficiency. This not only results in a low overall light coupling rate but also is not conducive to improving the uniformity of the outgoing light field.

SUMMARY

The present invention aims to provide a diffractive optical waveguide and a display device comprising the diffractive optical waveguide, so as to at least partly overcome the deficiencies in the prior art.

According to one aspect of the present invention, an optical waveguide device for expanding input light beam based on one-dimensional grating and two-dimensional grating is provided, comprising a waveguide substrate and a coupling-in grating and a coupling-out grating arranged on the waveguide substrate, and the coupling-in grating is configured to couple an input light beam from outside of the waveguide substrate into the waveguide substrate so that the input light beam is transmitted to the coupling-out grating through total reflection, wherein the coupling-in grating has a grating vector direction pointing to the coupling-out grating, and the coupling-out grating comprises a one-dimensional region in which a one-dimensional grating is formed and a two-dimensional region in which a two-dimensional grating is formed.

In some embodiments, the one-dimensional region is further away from an imaginary line representing a main propagation direction in the waveguide substrate than the two-dimensional region, the imaginary line passing through an approximate center of the coupling-in grating and extending along the grating vector direction.

Advantageously, the one-dimensional region is located on one or both sides of the two-dimensional region in a direction perpendicular to the grating vector direction.

Advantageously, the coupling-out grating has a first end close to the coupling-in grating and a second end opposite to the first end, and the two-dimensional region extends from the first end to the second end.

Advantageously, the two-dimensional region has a gradually increased width along the grating vector direction.

Advantageously, the coupling-in grating diffracts the input light beam that is within a predetermined field of view range to form coupling-in light propagating toward the coupling-out grating, and the region where the coupling-in light propagates through the coupling-out grating in a total reflection manner is a total reflection path region, wherein the two-dimensional region is formed to be corresponding to the total reflection path region.

Advantageously, the two-dimensional region is formed to substantially coincide with the total reflection path region, or to cover the entire total reflection path region with a predetermined margin.

Advantageously, the two-dimensional region comprises a plurality of two-dimensional partitions, two-dimensional sub-gratings are formed in individual two-dimensional partitions and have the same grating vector, and the two-dimensional sub-grating in at least one of the two-dimensional partitions has a different optical structure from the two-dimensional sub-grating in another two-dimensional partition.

Advantageously, the one-dimensional region comprises a plurality of one-dimensional partitions, one-dimensional sub-gratings being formed in individual one-dimensional partitions, and the one-dimensional sub-gratings in the one-dimensional partitions that are located on the same side of the imaginary line have the same grating vector, and the one-dimensional sub-grating in at least one of the one-dimensional partitions has a different optical structure from the one-dimensional sub-grating in another one-dimensional partition.

Advantageously, the different optical structure can be an optical structure having a different cross-sectional shape, a different cross-sectional dimension, a different groove angle, a different groove duty cycle, and/or a different height or depth.

The two-dimensional region can comprise regularly arranged partitions or irregularly arranged partitions.

The one-dimensional region can comprise regularly arranged partitions or irregularly arranged partitions.

The two-dimensional region and/or the one-dimensional region can comprise regularly arranged partitions or irregularly arranged partitions.

In some embodiments, the two-dimensional region comprises a plurality of two-dimensional partitions, two-dimensional sub-gratings being formed in individual two-dimensional partitions, the one-dimensional region comprises a plurality of one-dimensional partitions, one-dimensional sub-gratings being formed in individual one-dimensional partitions: and with a distance from an imaginary line representing the main propagation direction in the waveguide increasing, the area occupied by the two-dimensional partitions decreases, the area occupied by the one-dimensional partitions increases, the imaginary line passing through an approximate center of the coupling-in grating and extending along the grating vector direction.

Advantageously, an arrangement density of the two-dimensional partitions gradually decreases from middle to both sides perpendicular to the grating vector direction, and an arrangement density of the one-dimensional partitions gradually increases from middle to both sides perpendicular to the grating vector direction.

The two-dimensional partitions and the one-dimensional partitions are regularly arranged partitions, or are irregularly arranged partitions.

Advantageously, the two-dimensional partitions and the one-dimensional partitions are symmetrically distributed with respect to the imaginary line.

Advantageously, the coupling-in grating diffracts the input light beam that is within a predetermined field of view range to form coupling-in light propagating toward the coupling-out grating, the region where the coupling-in light propagates through the coupling-out grating in a total reflection manner is a total reflection path region, wherein the two-dimensional partitions have significantly different arrangement densities in and outside of the total reflection path region.

Advantageously, the two-dimensional sub-grating in at least one of the two-dimensional partitions has a different optical structure from the two-dimensional sub-grating in another two-dimensional partition.

Advantageously, the one-dimensional sub-grating in at least one of the one-dimensional partitions has the same grating vector as and a different optical structure from the one-dimensional sub-gratings in another one-dimensional partition.

Advantageously, the plurality of one-dimensional partitions are divided into a plurality of first one-dimensional partitions located on one side of the imaginary line and a plurality of second one-dimensional partitions located on the other side of the imaginary line, wherein the one-dimensional sub-gratings in the plurality of first one-dimensional partitions have the same first grating vector, the one-dimensional sub-gratings in the plurality of second one-dimensional partitions have the same second grating vector, and the first grating vector is different from the second grating vector; and the one-dimensional sub-grating in at least one of the first one-dimensional partitions has a different optical structure from the one-dimensional sub-grating in another first one-dimensional partition, and the one-dimensional sub-grating in at least one of the second one-dimensional partitions has a different optical structure from the one-dimensional sub-grating in another second one-dimensional partition.

According to another aspect of the present invention, a display device is provided, comprising the optical waveguide device.

Advantageously, the display device is a near-eye display device and comprises a lens and a frame for holding the lens close to the eye, the lens comprising the optical waveguide device.

Advantageously, the display device is an augmented reality display device or a virtual reality display device.

According to the optical waveguide device and the display equipment provided by the embodiment of the invention, the coupled-out grating based on the mixed one-dimensional grating and two-dimensional grating can realize a two-dimensional expansion of light in a plane, and can also effectively improve the light utilization/coupling efficiency of the optical waveguide device.

BRIEF DESCRIPTION OF THE DRAWINGS

Other features, objects, and advantages of the invention will become more apparent by reading the following detailed description of non-limitative embodiments with reference to the following drawings.

DETAILED DESCRIPTION

Figure 1:
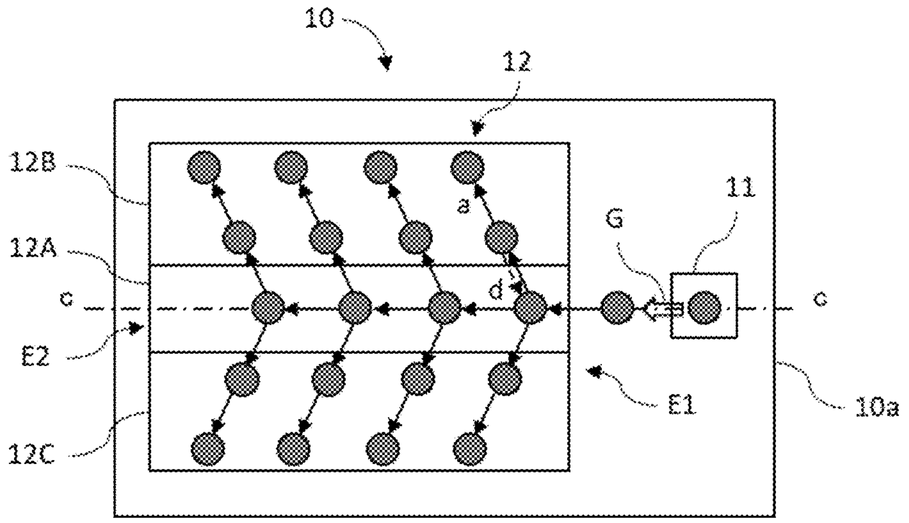
FIG. 1 is a schematic diagram of Example 1 of an optical waveguide device according to the first embodiment of the present invention.

The invention will be further described in detail in conjunction with drawings and embodiments. It should be understood that the specific embodiments described herein are only used to explain the related invention, but not to limit the invention. In addition, it should be noted that, for the convenience of description, only the parts related to the invention are shown in the drawings. It should be noted that the embodiments in the present application and the features of the embodiments may be combined with each other without conflict. The present invention will be described in detail below with reference to drawings and embodiments.

FIGS. 1 to 10 show optical waveguide devices according to different embodiments and variants of the present invention, wherein each optical waveguide device comprises a waveguide substrate and a coupling-in grating and a coupling-out grating arranged on the waveguide substrate. In FIGS. 1 to 10, the waveguide substrates are marked with reference numerals 10*a*, 20*a*, 30*a*, 40*a*, 50*a*, 60*a*, 70*a*, 80*a*, 90*a*, and 100*a* respectively, and the reference numerals 11, 21, 31, 41, 51, 61, 71, 81, 91, and 101 denote coupling-in gratings, and reference numerals 12, 22, 32, 42, 52, 62, 72, 82, 92, and 102 denote coupling-out gratings. If it is not necessary, the corresponding relationship between the above-mentioned reference numerals and the marked features will not be introduced separately below.

In the optical waveguide device according to the embodiment of the present invention, the coupling-in grating is configured to couple an input light beam from outside of the waveguide substrate into the waveguide substrate so that the input light beam is transmitted to the coupling-out grating through total reflection. After receiving a thinner input light beam from the coupling-in grating, the coupling-out grating continuously expands the light beam in two directions in a plane by diffraction and simultaneously partially couples the light beam out of the waveguide substrate, achieving a function of expanding the pupil in the plane enabling the observer to observe the display information carried by the input light beam in a larger eyebox.

FIG. 1 schematically shows an example of an optical waveguide device according to the first embodiment of the present invention, that is, an optical waveguide device 10. As shown in FIG. 1, the optical waveguide device 10 comprises a waveguide substrate 10*a* and a coupling-in grating 11 and a coupling-out grating 12 arranged on the waveguide substrate 10*a*. The coupling-in grating 11 has a grating vector direction G pointing to the coupling-out grating 12.

In this application, "grating vector" is used to describe the periodic characteristics of the grating structure, wherein the direction of "grating vector" is parallel to the direction along which the structure of the grating is periodically changed/arranged (for example, it is perpendicular to the direction of the grating lines/grooves: the magnitude of "grating vector" is $2\pi/d$, where d is the period of the grating structure in the direction of "grating vector", also known as "grating period".

Figure 12:
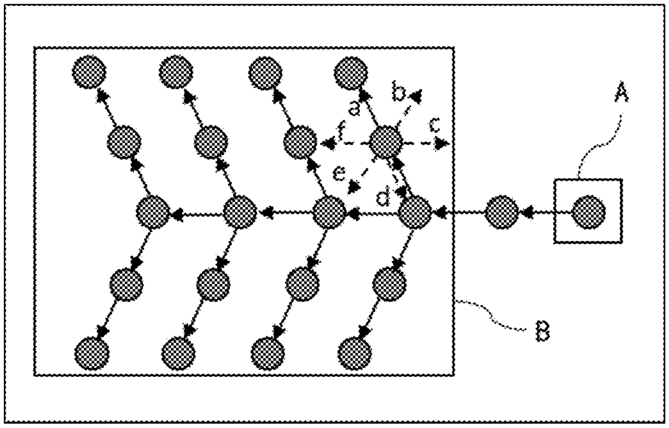
FIG. 12 schematically illustrates an optical waveguide device for display of the prior art.

As shown in FIG. 1, the coupling-out grating 12 comprises a two-dimensional region 12A formed with two-dimensional grating and one-dimensional regions 12B and 12C formed with one-dimensional grating. In FIG. 1, light beam incident on the coupling-in grating 11 and the propagation of the light beam in the waveguide substrate 10*a*, especially in the coupling-out grating 12, are schematically represented by circles. According to the embodiment of the present invention, as shown in FIG. 1, in the one-dimensional region/grating of the coupling-out grating 12, there are only two transmission orders a and d except for coupling-out orders: compared with what is shown in FIG. 12, the energy of the transmission orders b, c, d, and e backward transmitted in the existing two-dimensional coupling-out gratings B is distributed to the coupling-out orders and transmission orders a and d in the one-dimensional coupling-out grating according to the embodiment of the present invention, which can effectively increase the coupling-out energy and the energy of the outward transmitted total reflection zero-order a. Therefore, according to the embodiment of the present invention, the coupling-out grating based on the mixed one-dimensional grating and two-dimensional grating can realize a two-dimensional expansion of light in a plane, and can also effectively improve the light utilization/coupling efficiency of the optical waveguide device.

In addition, from the perspective of processing and manufacturing, one-dimensional grating is easier to process than two-dimensional grating, and the reduction degree of grating design is higher. Therefore, the optical waveguide device based on the mixed one-dimensional and two-dimensional coupling-out gratings according to the embodiment of the present invention is easier to design and manufacture, which is beneficial to reduce the cost and improve the yield.

According to this embodiment, the one-dimensional regions 12B and 12C are further away from an imaginary line c-c representing a main propagation direction in the waveguide substrate than the two-dimensional region 12A, the imaginary line c-c passing through an approximate center of the coupling-in grating 11 and extending along the grating vector direction G. In the example shown in FIG. 1, the one-dimensional regions 12B and 12C are located on both sides of the two-dimensional region 12A perpendicular to the grating vector direction G.

As shown in FIG. 1, the coupling-out grating 12 has a first end E1 close to the coupling-in grating 11 and a second end E2 opposite to the first end E1, and the two-dimensional region 12A can extend from the first end E1 to the second end E2. However, the present invention is not limited to this. In other embodiments according to the present invention, the two-dimensional region 12A can also only extend close to the second end E2, and a section of one-dimensional grating/one-dimensional region is connected to the end close to the second end E2. In short, each one-dimensional grating/region in the coupling-out grating is downstream of the light propagation path relative to the two-dimensional grating/region, the coupling-out grating not only achieves two-dimensional expansion through the upstream two-dimensional grating but also realizes the improvement of light utilization/coupling efficiency through the one-dimensional grating.

Figure 2:
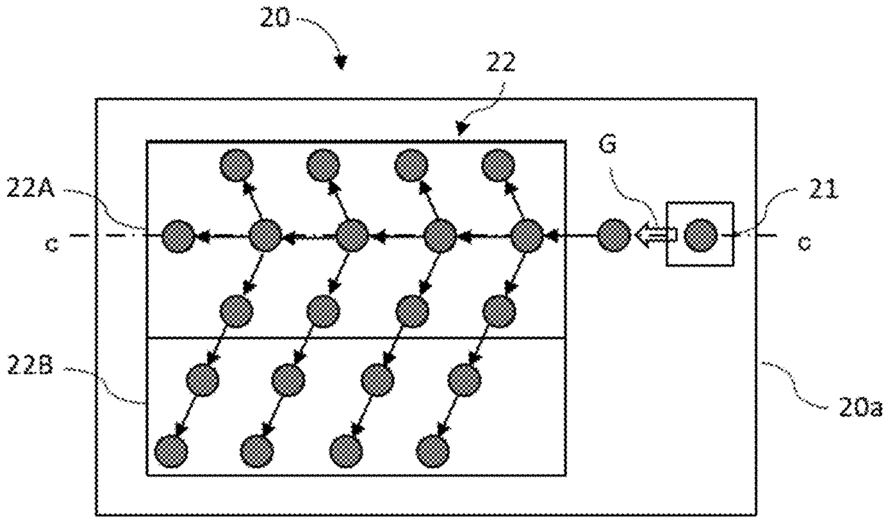
FIG. 2 schematically shows a variation of the optical waveguide device shown in FIG. 1.

FIG. 2 schematically shows a variant of the optical waveguide device shown in FIG. 1. An optical waveguide device 20 shown in FIG. 2 has basically the same structure as the optical waveguide device 10 shown in FIG. 1, with the difference that: in the optical waveguide device 20, a coupling-in grating 21 is arranged in a biased manner relative to a coupling-out grating 22, and correspondingly the coupling-out grating 22 comprises a two-dimensional region 22A and a one-dimensional region 22B located on one side of the two-dimensional region 22A. As in the optical waveguide device 10, the one-dimensional region 22B is further away from the imaginary line c-c representing the main propagation direction in the waveguide than the two-dimensional region 22A, the imaginary line c-c passing through an approximate center of the coupling-in grating 21 and extending along the grating vector direction G of the coupling-in grating 21. Likewise, this makes the one-dimensional region 22B in the downstream of the light propagation path relative to the two-dimensional region 22A, and the coupling-out grating 22 not only achieves two-dimensional expansion through the upstream two-dimensional grating but also realizes the improvement of light utilization/coupling efficiency through the one-dimensional grating.

Optical waveguide devices according to the second embodiment of the present invention will be described below with reference to FIGS. 3 to 5.

Figure 3:
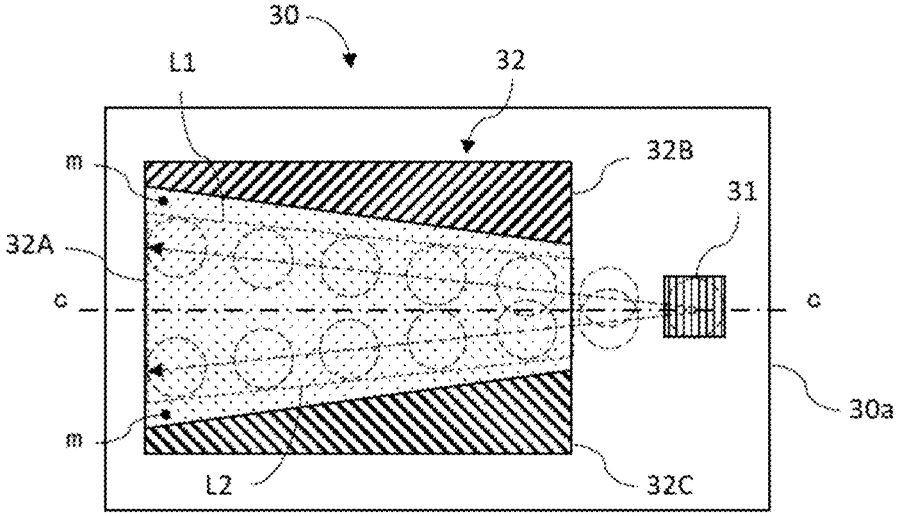
FIG. 3 is a schematic diagram of Example 1 of an optical waveguide device according to the second embodiment of the present invention.

FIG. 3 schematically shows Example 1 of an optical waveguide device according to the second embodiment of the present invention. An optical waveguide device 30 shown in FIG. 3 has basically the same structure as the optical waveguide device 10 shown in FIG. 1, with the difference that: in the optical waveguide device 30, a two-dimensional region 32A of the coupling-out grating 32 has a gradually increased width along the grating vector direction G (see FIG. 1).

When input light beam is incident on a coupling-in grating 31, it can have a certain inclination with respect to the normal line of the surface of the coupling-in grating 31 (generally the same as the normal line of the plane of a waveguide substrate 30*a*), and the range of the inclination is referred to here as Field of View (FOV) of the input light beam. The coupling-in grating 31 diffracts the input light beam that is within a predetermined FOV range to form the coupling-in light propagates toward the coupling-out grating 32, and the region where the coupling-in light propagates through the out-coupling grating 32 in a total reflection manner is a "total reflection path region". When the incident inclination of the input light beam changes within the predetermined FOV range, the direction in which the coupling-in light propagates in the coupling-out grating 32 changes between the ranges schematically indicated by the two dotted arrows in FIG. 3. In FIG. 3, the dotted circles schematically represent the input light beam and its propagation in the waveguide substrate 30*a,* especially in the coupling-out grating 32 through total reflection along the directions indicated by the above two dotted arrows. The area between the outer envelopes L1 and L2 of the dotted circles shown in FIG. 3 is the above "total reflection path region".

Preferably, the two-dimensional region of the optical waveguide device according to the embodiment of the present invention is formed to be corresponding to the total reflection path region. In the example shown in FIG. 3, the two-dimensional region 32A covers the total reflection path region with a certain margin of m. Adaptively, the two one-dimensional regions 32B and 32C of the coupling-out grating 32 of the optical waveguide device 30 have a complementary shape and size to the two-dimensional region 32A.

Figure 4:
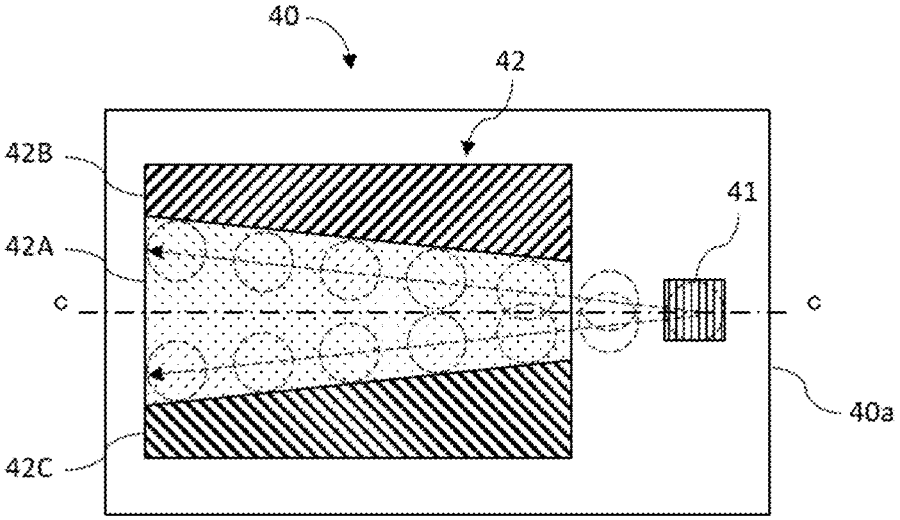
FIG. 4 is a schematic diagram of Example 2 of the optical waveguide device according to the second embodiment of the present invention.
Figure 5:
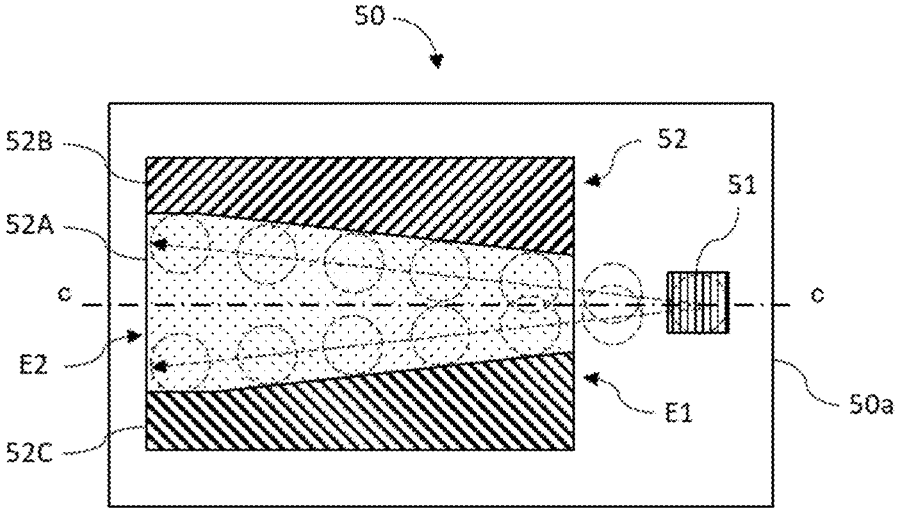
FIG. 5 is a schematic diagram of Example 3 of the optical waveguide device according to the second embodiment of the present invention.

FIG. 4 shows Example 2 of the optical waveguide device according to the second embodiment of the present invention. In the example shown in FIG. 4, a two-dimensional region 42A and one-dimensional regions 42B and 42C of the coupling-out grating 42 of the optical waveguide device 40 have substantially the same structure as the two-dimensional region 32A and one-dimensional regions 32B and 32C of the coupling-out grating 32 of the optical waveguide device 30 shown in FIG. 3, the only difference is that the two-dimensional region 42A in the optical waveguide device 40 is formed to substantially coincide with the total reflection path region, as shown in FIG. 4.

In the optical waveguide device according to the embodiment, the corresponding relationship between the two-dimensional region of the coupling-out grating and the total reflection path region is not limited to the two-dimensional region at least completely covering the total reflection path region. For example, in Example 3 of the optical waveguide device according to the second embodiment of the present invention shown in FIG. 5, namely, in the optical waveguide device 50, a two-dimensional region 52A of a coupling-out grating 52 has a smaller width (dimensions in the upper and lower directions in the drawing) at the end away from a coupling-in grating 51 than the total reflection path region shown by the dotted lines L1 and L2 in FIG. 3, and is in the shape of "truncated". It should be understood that what is shown in FIG. 5 is only exemplary, and in other implementation manners, the two-dimensional region of the coupling-out grating can be corresponding to the total reflection path region in other ways.

According to the second embodiment of the present invention, the two-dimensional region of the coupling-out grating of the optical waveguide device is set to be corresponding to the total reflection path region. On the one hand, it ensures that the input light beam with a "limit" incident inclination within a predetermined field of view can fully realize the two-dimensional expansion(pupil expansion) in the waveguide plane through the two-dimensional grating in the two-dimensional region when it is coupled in and propagated to the coupling-out grating, on the other hand, the one-dimensional grating is used as much as possible to improve the optical coupling efficiency. For example, referring to FIGS. 3 to 5, the optical waveguide device according to the second embodiment of the present invention has a smaller width at the first end E1 of the coupling-out grating close to the coupling-in grating, and correspondingly, the one-dimensional region can have a larger width, thus allowing more utilization of the one-dimensional region of the one-dimensional grating to improve optical coupling efficiency.

Figure 6:
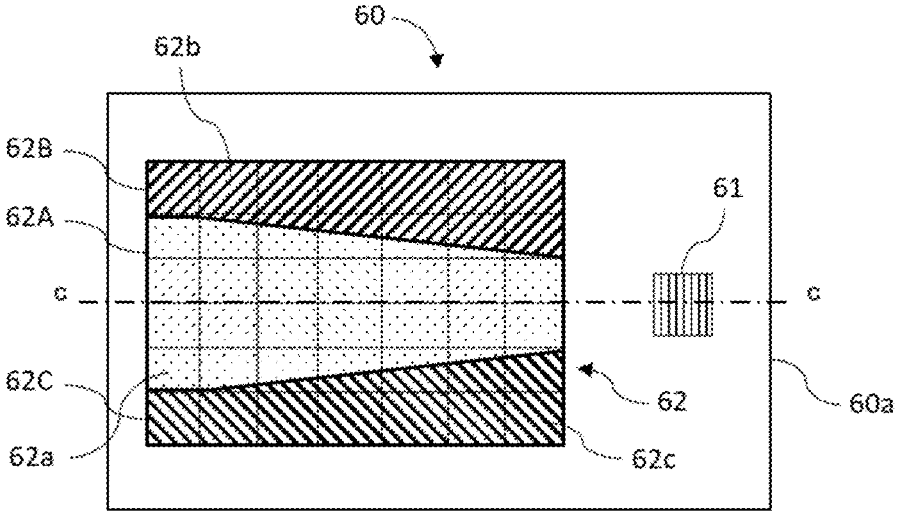
FIG. 6 is a schematic diagram of Example 1 of an optical waveguide device according to the third embodiment of the present invention.
Figure 7:
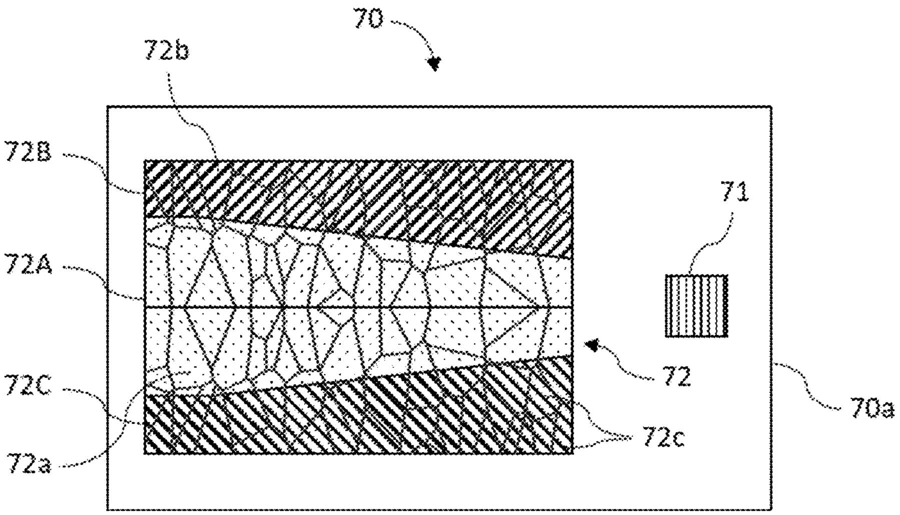
FIG. 7 is a schematic diagram of Example 2 of the optical waveguide device according to the third embodiment of the present invention.

FIGS. 6 and 7 show different examples of optical waveguide device according to the third embodiment of the present invention. According to the third embodiment, a two-dimensional region and a one-dimensional region of the coupling-out grating can be partitioned and sub-gratings with different optical structures can be formed, which allows different diffraction and coupling-out efficiencies to be achieved in the partitions, so as to be more flexibly and effectively adjust the light energy uniformity of the outgoing light field of the coupling-out grating.

Referring to FIG. 6, the optical waveguide device 60 according to the third embodiment comprises a waveguide substrate 60*a* and a coupling-in grating 61 and a coupling-out grating 62 arranged on the waveguide substrate 60*a*. The coupling-out grating 62 comprises two-dimensional region 62A and one-dimensional regions 62B and 62C. Similar to the optical waveguide device 50 shown in FIG. 5, the two-dimensional region 62A in the optical waveguide device 60 is formed to be corresponding to the total reflection path region of the coupling-out grating 62, and the one-dimensional regions 62B and 62C are located on both sides of the two-dimensional region 62A in a direction perpendicular to the grating vector direction G of the coupling-out grating 62.

According to this embodiment, the two-dimensional region 62A can comprise a plurality of two-dimensional partitions 62*a,* and two-dimensional sub-gratings are formed in individual two-dimensional partitions 62*a* and have the same grating vector, and the two-dimensional sub-grating in at least one of the two-dimensional partitions 62*a* has a optical structure different from the two-dimensional sub-grating in another two-dimensional partitions 62*a.*

As shown in FIG. 6, the one-dimensional regions 62B and 62C can respectively comprise a plurality of one-dimensional partitions, and one-dimensional sub-gratings are formed in individual one-dimensional partitions. The one-dimensional sub-gratings in the one-dimensional partitions 62*b* that are located on one side of the imaginary line c-c have the same grating vector, and the one-dimensional sub-grating in at least one of the one-dimensional partitions 62*b* has a different optical structure from the one-dimensional sub-grating in another one-dimensional partition 62*b*. The one-dimensional sub-gratings in the one-dimensional partitions 62*c* that are located on the other side of the imaginary line c-c have the same grating vector, and the one-dimensional sub-grating in at least one of the one-dimensional partitions 62*c* has a optical structure different from the one-dimensional sub-grating in another one-dimensional partition 62*c*.

It should be understood that, according to this embodiment, only the two-dimensional region 62A or only the one-dimensional regions 62B and 62C can comprise partitions, and it is not limited to an implementation manner in which both comprise multiple partitions.

The different optical structures of the sub-grating can be an optical structure having a different cross-sectional shape, a different cross-sectional dimension, a different groove angle, a different groove duty cycle, and/or a different height or depth (height of convex-shaped optical structure or of concave-shaped optical structure). By changing the optical structure of the grating, the diffraction efficiency of the grating can be changed, thereby changing the coupling-out efficiency of light.

In the example shown in FIG. 6, the two-dimensional region 62A and the one-dimensional regions 62B and 62C respectively comprise regular two-dimensional partitions 62*a* and one-dimensional partitions 62*b* and 62*c*. However, it should be understood that the present invention is not limited to this. For example, referring to the optical waveguide device 70 shown in FIG. 7, two-dimensional region 72A and one-dimensional regions 72B and 72C of a coupling-out grating 72 can respectively comprise irregularly arranged two-dimensional partitions 72*a* and one-dimensional partitions 72*b* and 72*c*.

Although in the examples shown in FIGS. 6 and 7, the two-dimensional region and the one-dimensional region are divided into a plurality of partitions according to a unified partition method (such as regular partition or irregular partition), it should be understood that they can also use different partition methods, for example, the two-dimensional region comprises a plurality of irregular partitions and the one-dimensional region comprises a plurality of regular partitions.

In addition, it should be understood that, although in the examples shown in FIGS. 6 and 7, the two-dimensional regions 62A and 72A are shown to substantially coincide with the total reflection path region, it should be understood that the optical waveguide device according to the third embodiment of the present invention is not limited to this feature of the two-dimensional region, for example, the partition according to the third embodiment can also be applied to the optical waveguide device according to the first embodiment of the present invention described with reference to FIGS. 1 and 2.

Next, optical waveguide devices according to the fourth embodiment of the present invention and its variants will be described with reference to FIGS. 8 to 10.

Figure 8:
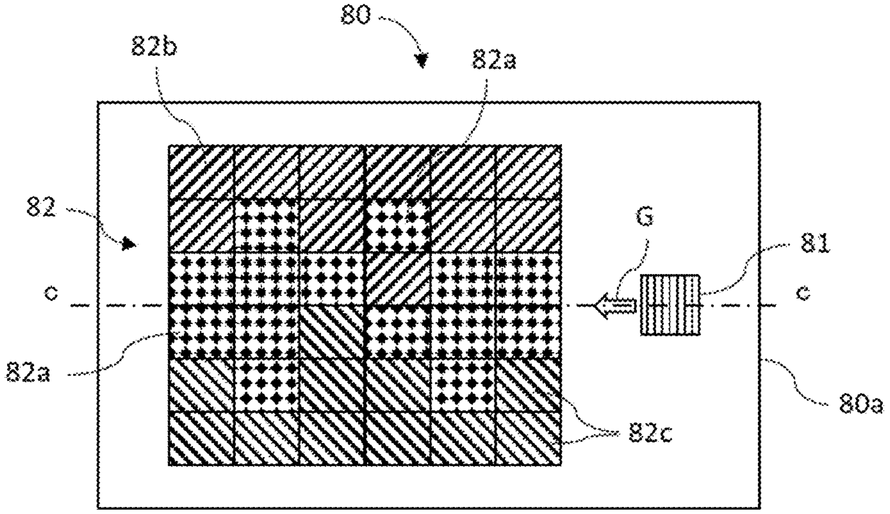
FIG. 8 is a schematic diagram of Example 1 of an optical waveguide device according to the fourth embodiment of the present invention.

FIG. 8 shows Example 1 of an optical waveguide device according to the fourth embodiment of the present invention. As shown in FIG. 8, the optical waveguide device 80 comprises a waveguide substrate 80*a* and a coupling-in grating 81 and a coupling-out grating 82 arranged on the waveguide substrate 80*a*. The coupling-in grating 81 has a grating vector direction G pointing to the coupling-out grating 82, and the coupling-out grating 82 comprises a one-dimensional region in which a one-dimensional grating is formed and a two-dimensional region in which a two-dimensional grating is formed. The two-dimensional region comprises a plurality of two-dimensional partitions 82*a*, and two-dimensional sub-gratings are formed in the two-dimensional partitions 82*a*. The one-dimensional region comprises a plurality of one-dimensional partitions 82*b* and 82*c*, one-dimensional sub-gratings are formed in the one-dimensional partitions 82*b* and 82*c*. According to this embodiment, with a distance from an imaginary line c-c passing through an approximate center of the coupling-in grating 81 and extending along the grating vector direction G increasing, the area occupied by the two-dimensional partitions 82*a* decreases, the area occupied by the one-dimensional partitions 82*b* and 82*c* increases.

In the example shown in FIG. 8, the two-dimensional partitions and one-dimensional partitions of the coupling-out grating 82 are regularly arranged partitions, and an arrangement density of the two-dimensional partitions 82*a* gradually decreases from middle to both sides perpendicular to the grating vector direction G, and an arrangement density of the one-dimensional partitions 82*b* and 82*c* gradually increases from middle to both sides perpendicular to the grating vector direction G.

According to this embodiment, the two-dimensional region and the one-dimensional region of the coupling-out grating can be partitioned and sub-gratings with different optical structures can be formed in the partitions, which allows different diffraction and coupling-out efficiencies to be achieved in different positions of the coupling-out grating, in order to more flexibly and effectively adjust the light energy uniformity of the outgoing light field of the coupling-out grating. Moreover, according to this embodiment, the two-dimensional partitions and the one-dimensional partitions can be mixed to some extent, so that part of the two-dimensional partitions is embedded in the one-dimensional partitions and/or part of the one-dimensional partitions is embedded in the two-dimensional partitions. This is conducive to more flexible optimization of the optical structure of each region of the coupling-out grating, thereby adjusting the coupling efficiency and uniformity of the coupling-out grating, and achieving a better diffraction display effect.

According to this embodiment, the two-dimensional sub-grating in at least one of the two-dimensional partitions 82*a* has a different optical structure from the two-dimensional sub-grating in another two-dimensional partition 82*a*.

As shown in FIG. 8, the plurality of one-dimensional partitions of the coupling-out grating 82 are divided into first one-dimensional partitions 82*b* located on one side of the imaginary line c-c and second one-dimensional partitions 82*c* located on the other side of the imaginary line c-c, wherein the one-dimensional sub-gratings in the first one-dimensional partitions 82*b* have the same first grating vector, the one-dimensional sub-gratings in the second one-dimensional partitions 82*c* have the same second grating vector, and the first grating vector is different from the second grating vector. The one-dimensional sub-grating in at least one of the first one-dimensional partitions 82*b* has a different optical structure from the one-dimensional sub-grating in another first one-dimensional partition 82*b*, and the one-dimensional sub-grating in at least one of the second one-dimensional partitions 82*c* has a different optical structure from the one-dimensional sub-grating in another second one-dimensional partition 82c.

The optical waveguide device according to the fourth embodiment is not limited to the implementation of the regular partitions of the coupling-out grating. For example, as shown in FIG. 9, in an optical waveguide device 90 according to the fourth embodiment of the present invention, two-dimensional partitions 92a and one-dimensional partitions 92b and 92c of a coupling-out grating 92 can be irregularly arranged partitions.

Figure 9:
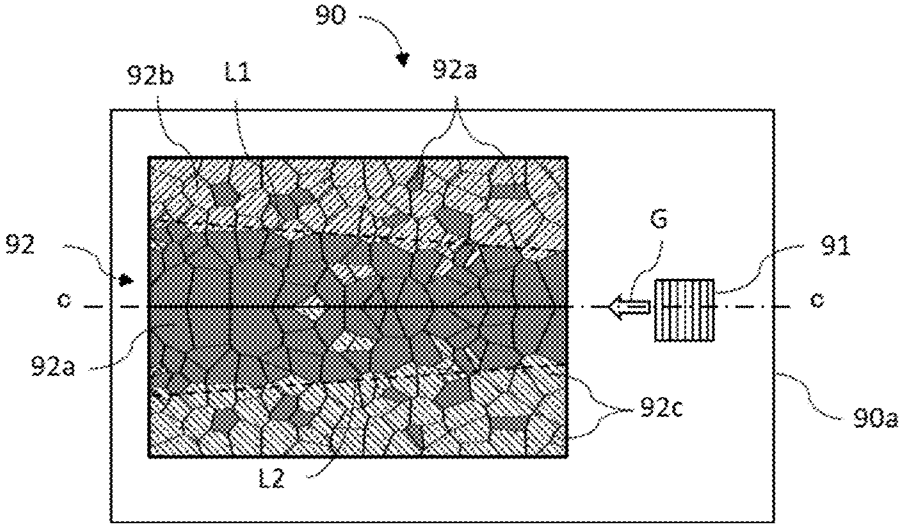
FIG. 9 is a schematic diagram of Example 2 of the optical waveguide device according to the fourth embodiment of the present invention.

As shown in FIG. 9, the two-dimensional partitions 92a and one-dimensional partitions 92b and 92c can be symmetrically distributed with respect to the imaginary line c-c passing through an approximate center of a coupling-in grating 91 and extending along the grating vector direction G.

In addition, the coupling-in grating 91 diffracts the input light beam within a predetermined field of view to form coupling-in light propagating toward the coupling-out grating 92, the region where the coupling-in light propagates through the coupling-out grating 92 in a total reflection manner is the total reflection path region. The range of the "total reflection path region" is shown by dotted lines L1 and L2 in FIG. 9. In the example shown in FIG. 9, the two-dimensional partitions 92a have significantly different arrangement densities in and outside of the total reflection path region. The effect of such an arrangement is similar to the effect achieved in the optical waveguide device according to the second embodiment of the present invention, and will not be repeated here.

Figure 10:
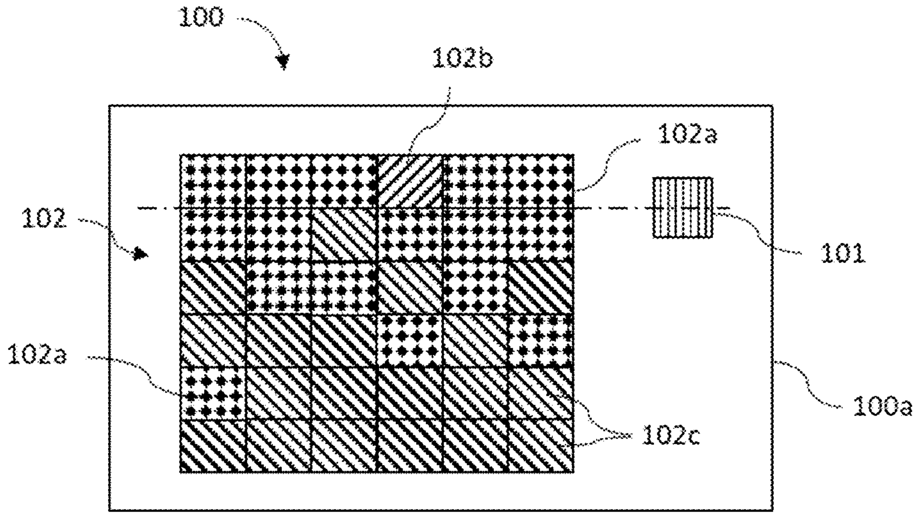
FIG. 10 schematically shows a variation of the optical waveguide device shown in FIG. 8.

An optical waveguide device 100 shown in FIG. 10 is a variant of the optical waveguide device 80 shown in FIG. 8. The optical waveguide device 100 has basically the same structure as the optical waveguide device 80, except that: in the optical waveguide device 100, a coupling-in grating 101 is arranged in a biased manner relative to a coupling-out grating 102; two-dimensional region 102A of the coupling-out grating 102 is correspondingly arranged in a biased manner, and the number of first one-dimensional partitions 102b on one side of the imaginary line c-c passing through an approximate center of the coupling-in grating 81 and extending along the grating vector direction G is less, while the number of second one-dimensional partitions 102c on the other side of the imaginary line c-c is larger. As in the optical waveguide device 80, with a distance from the imaginary line c-c, the area occupied by the two-dimensional partitions 102a decreases, and the area occupied by the one-dimensional partitions 102b and 102c increases. Likewise, this allows different diffraction and outcoupling efficiencies to be achieved through different optical structures in individual partitions and allows two-dimensional partitions and one-dimensional partitions to be mixed to a certain extent, so as to optimize the coupling-out grating more flexibly, better adjust the coupling efficiency and uniformity of the coupling-out grating, and achieve better diffraction display effect.

The optical waveguide device according to the embodiment of the present invention can be applied in a display device. Such a display device is, for example, a near-eye display device, which comprises a lens and a frame for holding the lens close to the eye, wherein the lens can comprise the optical waveguide device according to the embodiment of the present invention as described above. Preferably, the display device can be an augmented reality display device or a virtual reality display device.

Figure 11:
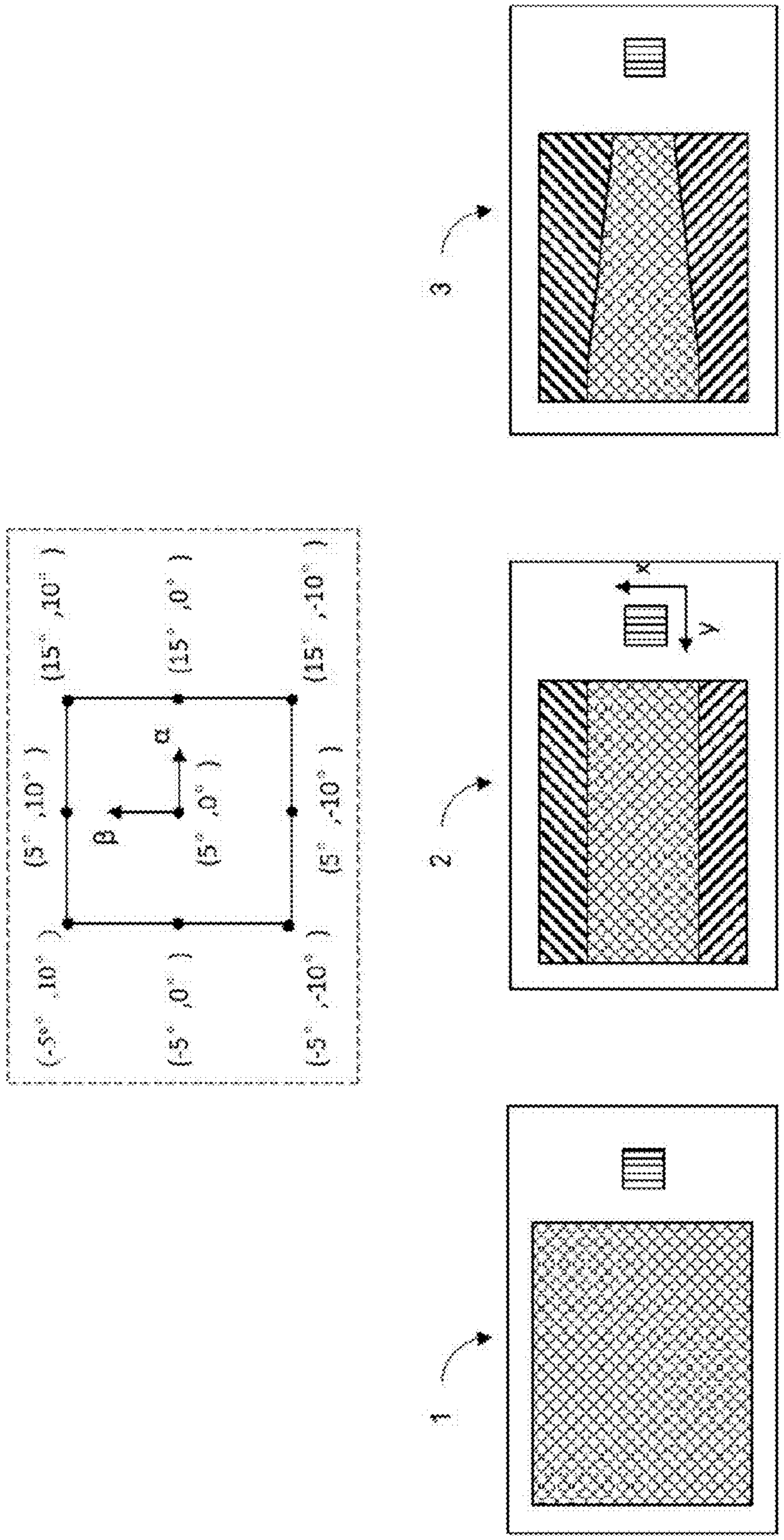
FIG. 11 schematically shows different structures of optical waveguide devices and the angle range of input light beam in the simulation examples.

Finally, in order to illustrate the technical advantages of the optical waveguide device according to the embodiment of the present invention in terms of optical coupling efficiency, a calculation example of simulation calculation will be given below. FIG. 11 schematically shows the structures of different optical waveguide devices compared in the simulation example and the range of the incident inclination angle of the input light beam.

As shown in FIG. 11, optical waveguide device 1 has a coupling-out grating with a simple two-dimensional grating the same as that shown in FIG. 12; Optical waveguide device 2 has a coupling-out grating with a rectangular two-dimensional region and a rectangular one-dimensional region the same as that shown in FIG. 1; Optical waveguide device 3 has a coupling-out grating as shown in FIG. 5, wherein the two-dimensional region is corresponding to the total reflection path region, and the maximum width of the two-dimensional region of the coupling-out grating in the optical waveguide device 3 is the same as the width of the two-dimensional region of the coupling-out grating in the optical waveguide device 2.

Taking the incident angle of the input light beam around the x-axis shown in FIG. 11 as angle α and the incident angle around the y-axis shown in FIG. 11 as angle β, the incident angle of the input light beam is noted as (α, β). The two-dimensional gratings and one-dimensional gratings of the coupling-out gratings of the optical waveguide devices 1, 2, and 3 in the calculation example have the same structure; the field of view of the input light beam is 20°×20°, and the incident angle corresponding to the center of the field of view is (5°, 0), and as shown in the upper figure in FIG. 11, the field of view distribution is: the angle α ranges from −5° to 15°, and the angle β ranges from −10° to 10°.

According to the simulation calculation, average exit-pupil coupling efficiencies of the optical waveguide devices 1, 2, and 3 for input light beams with different incident angles are shown in the table below.

TABLE 1

| (α, β) | (−5°, 10°) | (5°, 10°) | (15°, 10°) | (−5°, 0°) | (5°, 0°) | (15°, 0°) |
|---|---|---|---|---|---|---|
| optical waveguide device 1 | 1.80E−03 | 2.70E−03 | 2.70E−03 | 2.30E−03 | 2.80E−03 | 2.50E−03 |
| optical waveguide device 2 | 3.50E−03 | 4.10E−03 | 4.00E−03 | 4.50E−03 | 5.00E−03 | 4.30E−03 |
| optical waveguide device 3 | 3.90E−03 | 5.00E−03 | 4.60E−03 | 5.50E−03 | 5.90E−03 | 4.50E−03 |

Here, if the incident light energy entering the coupling-in grating of the optical waveguide device is $I_{in}$, and the average light energy between the exit-pupils exiting the eyebox of the coupling-out grating is $I_{E\text{-}ave}$, then the average exit-pupil coupling efficiency of the optical waveguide device is $r=I_{E\text{-}ave}/I_{in}$. From the results shown in Table 1, it can be seen that the optical waveguide devices 2 and 3 according to the embodiments of the present invention significantly improve the coupling efficiency of light energy, and the optical waveguide device 3 has better optical coupling efficiency than the optical waveguide device 2.

The above description is merely an illustration of the preferred embodiments of the present application and the applied technical principles. Those skilled in the art should understand that the scope of the invention involved in the present application is not limited to the technical solution formed by the specific combination of the above technical features, but also covers other technical solutions formed by any combination of the above technical features or their equivalent features without departing from the inventive concept. For example, the technical solution is formed by replacing the above features with (but not limited to) the technical features with similar functions disclosed in the present application.

What is claimed is:

1. An optical waveguide device for expanding input light beam based on one-dimensional grating and two-dimensional grating, comprising a waveguide substrate and a coupling-in grating and a coupling-out grating arranged on the waveguide substrate, and the coupling-in grating is configured to couple an input light beam from outside of the waveguide substrate into the waveguide substrate so that the input light beam is transmitted to the coupling-out grating through total reflection, wherein the coupling-in grating has a grating vector direction pointing to the coupling-out grating, and the coupling-out grating comprises a one-dimensional region in which a one-dimensional grating is formed and a two-dimensional region in which a two-dimensional grating is formed, wherein the two-dimensional region comprises a plurality of two-dimensional partitions, two-dimensional sub-gratings being formed in individual two-dimensional partitions;

the one-dimensional region comprises a plurality of one-dimensional partitions, one-dimensional sub-gratings being formed in individual one-dimensional partitions;

the two-dimensional partitions and the one-dimensional partitions are mixed so that part of the two-dimensional partitions is embedded in the one-dimensional partitions and part of the one-dimensional partitions is embedded in the two-dimensional partitions; and with a distance from an imaginary line representing a main propagation direction in the waveguide increasing, the area occupied by the two-dimensional partitions decreases, and the area occupied by the one-dimensional partitions increases, the imaginary line passing through an approximate center of the coupling-in grating and extending along the grating vector direction.

2. The optical waveguide device of claim 1, wherein the one-dimensional region is further away from the imaginary line than the two-dimensional region.

3. The optical waveguide device of claim 2, wherein the one-dimensional region is located on one or both sides of the two-dimensional region in a direction perpendicular to the grating vector direction.

4. The optical waveguide device of claim 1, wherein an arrangement density of the two-dimensional partitions gradually decreases from middle to both sides perpendicular to the grating vector direction, and an arrangement density of the one-dimensional partitions gradually increases from middle to both sides perpendicular to the grating vector direction.

5. The optical waveguide device of claim 1, wherein the two-dimensional partitions and the one-dimensional partitions are regularly arranged partitions, or are irregularly arranged partitions.

6. The optical waveguide device of claim 4, wherein the two-dimensional partitions and the one-dimensional partitions are symmetrically distributed with respect to the imaginary line.

7. The optical waveguide device of claim 1, wherein the coupling-in grating diffracts the input light beam that is within a predetermined field of view range to form coupling-in light propagating toward the coupling-out grating, the region where the coupling-in light propagates through the coupling-out grating in a total reflection manner is a total reflection path region, wherein the two-dimensional partitions have significantly different arrangement densities in and outside of the total reflection path region.

8. The optical waveguide device of claim 1, wherein the two-dimensional sub-grating in at least one of the two-dimensional partitions has a different optical structure from the two-dimensional sub-grating in another two-dimensional partition.

9. The optical waveguide device of claim 1, wherein the one-dimensional sub-grating in at least one of the one-dimensional partitions has the same grating vector as and a different optical structure from the one-dimensional sub-gratings in another one-dimensional partition.

10. The optical waveguide device of claim 4, wherein the plurality of one-dimensional partitions are divided into a plurality of first one-dimensional partitions located on one side of the imaginary line and a plurality of second one-dimensional partitions located on the other side of the imaginary line, wherein the one-dimensional sub-gratings in the plurality of first one-dimensional partitions have the same first grating vector, the one-dimensional sub-gratings in the plurality of second one-dimensional partitions have the same second grating vector, and the first grating vector is different from the second grating vector; and the one-dimensional sub-grating in at least one of the first one-dimensional partitions has a different optical structure from the one-dimensional sub-grating in another first one-dimensional partition, and the one-dimensional sub-grating in at least one of the second one-dimensional partitions has a different optical structure from the one-dimensional sub-grating in another second one-dimensional partition.

11. A display device comprising the optical waveguide device of claim 1.

12. The display device of claim 11, wherein the display device is a near-eye display device and comprises a lens and a frame for holding the lens close to the eye, the lens comprising the optical waveguide device.

13. The display device of claim 11, wherein the display device is an augmented reality display device or a virtual reality display device.

* * * * *